United States Patent
Ozawa et al.

(10) Patent No.: US 6,478,644 B1
(45) Date of Patent: *Nov. 12, 2002

(54) EXHAUST PIPE COOLING SYSTEM FOR WATERCRAFT

(75) Inventors: Shigeyuki Ozawa, Shizuoka (JP); Ryoichi Nakase, Shizuoka (JP); Hiroaki Fujimoto, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/966,336

(22) Filed: Nov. 7, 1997

(51) Int. Cl.[7] ............................................... B63H 21/32
(52) U.S. Cl. ............................................ 440/89; 440/1
(58) Field of Search ............................ 440/38, 88, 89, 440/1, 2; 60/286, 298; 441/71; 114/183 R

(56) References Cited

U.S. PATENT DOCUMENTS

| | | |
|---|---|---|
| 3,198,162 A | 8/1965 | Larsen |
| 3,899,765 A | 8/1975 | Daigneault, Jr. |
| 4,664,054 A | 5/1987 | Nishida |
| 4,699,596 A * | 10/1987 | Klinker et al. ............... 441/71 |
| 4,773,883 A | 9/1988 | Nakase et al. |
| 4,789,367 A | 12/1988 | Fulks |
| 4,811,560 A | 3/1989 | Nakase et al. |
| 4,831,822 A | 5/1989 | Yoshimura |
| 4,850,908 A | 7/1989 | Nakase et al. |
| 4,982,682 A | 1/1991 | Hattori |
| 4,989,409 A | 2/1991 | Nakase et al. |
| 4,997,399 A | 3/1991 | Nakayasu et al. |
| 5,067,448 A | 11/1991 | Nakase et al. |
| 5,067,918 A | 11/1991 | Kobayashi |
| 5,096,446 A | 3/1992 | Tazaki et al. |
| 5,150,663 A * | 9/1992 | Kobayashi ................. 441/71 |
| 5,167,934 A | 12/1992 | Wolf et al. |
| 5,199,913 A | 4/1993 | Toyohara et al. |
| 5,234,364 A | 8/1993 | Ito |
| 5,251,439 A | 10/1993 | Nakase et al. |
| 5,324,217 A | 6/1994 | Mineo |
| 5,334,063 A * | 8/1994 | Inoue et al. ................. 440/88 |
| 5,366,401 A | 11/1994 | Nanami et al. |
| 5,531,620 A * | 7/1996 | Ozawa et al. ............... 440/89 |
| 5,562,509 A | 10/1996 | Nakase et al. |
| 5,746,054 A * | 5/1998 | Matte ......................... 60/310 |

FOREIGN PATENT DOCUMENTS

JP 9-41963 10/1997

* cited by examiner

Primary Examiner—Ed Swinehart
(74) Attorney, Agent, or Firm—Knobbe, Martens, Olson & Bear, LLP.

(57) ABSTRACT

An exhaust pipe cooling system regulates the temperature of a exhaust system catalyzer on a small watercraft to ensure proper functioning and to inhibit overheating of the catalyzer. The cooling system supplies fresh water to a water jacket which surrounds the catalyzer in a manner independent of an engine cooling system. The cooling system also supplies fresh water to an upwardly oriented discharge nozzle. The upward water jet from the nozzle spays well above the surface of the body of water in which the watercraft is operated to provide a visible indicator of location of the small watercraft. A control valve regulate the flow rate of water through the cooling system to adjust the temperature of the catalyzer to fall within a desired range of operating temperatures. Under normal conditions, at least a majority of the water flows through the discharge nozzle; however, if the temperature of the catalyzer rises to an undesirably level, the control valve routes at least an increased portion of the water to the water jacket surrounding the catalyzer.

25 Claims, 6 Drawing Sheets

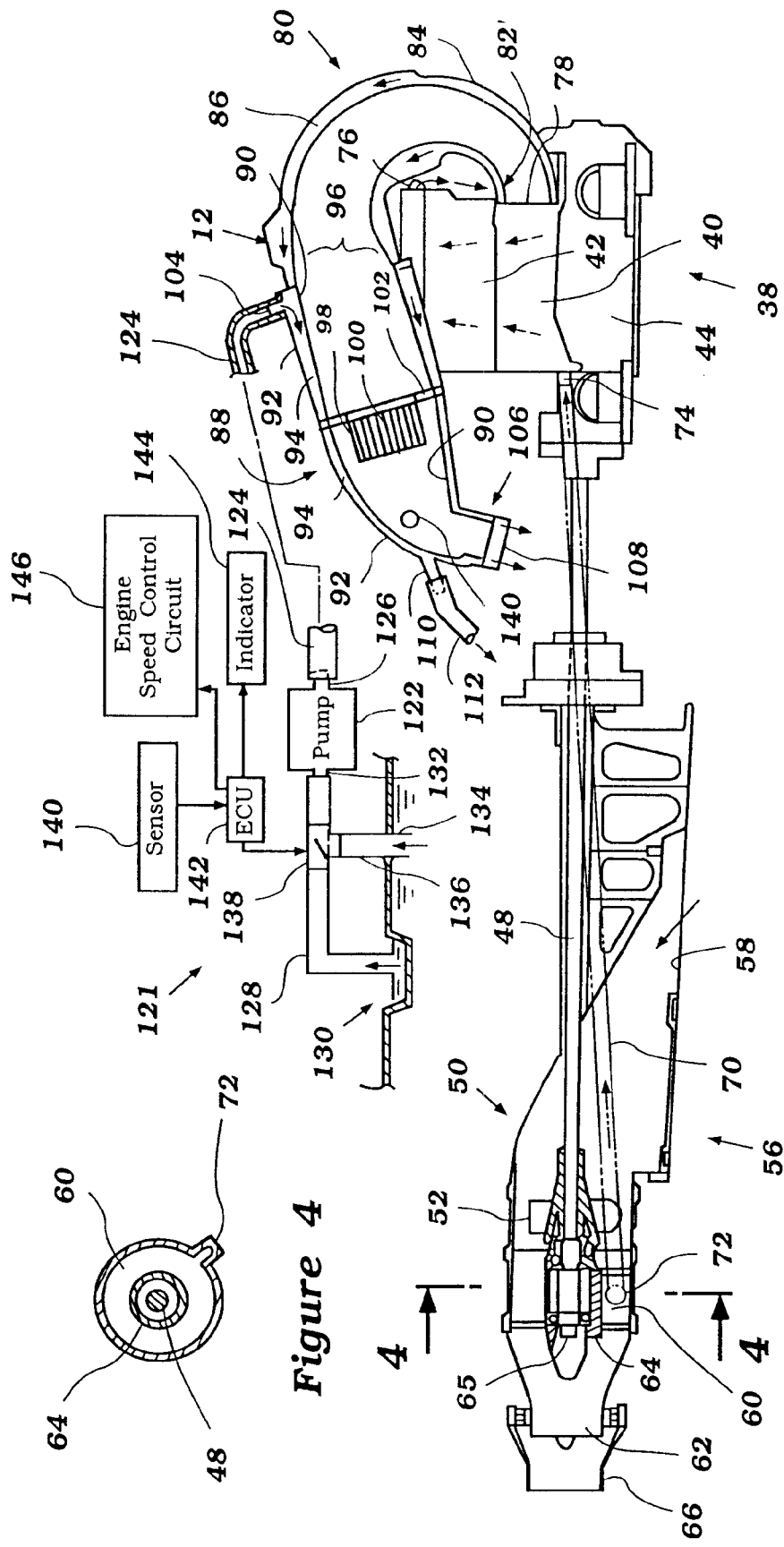

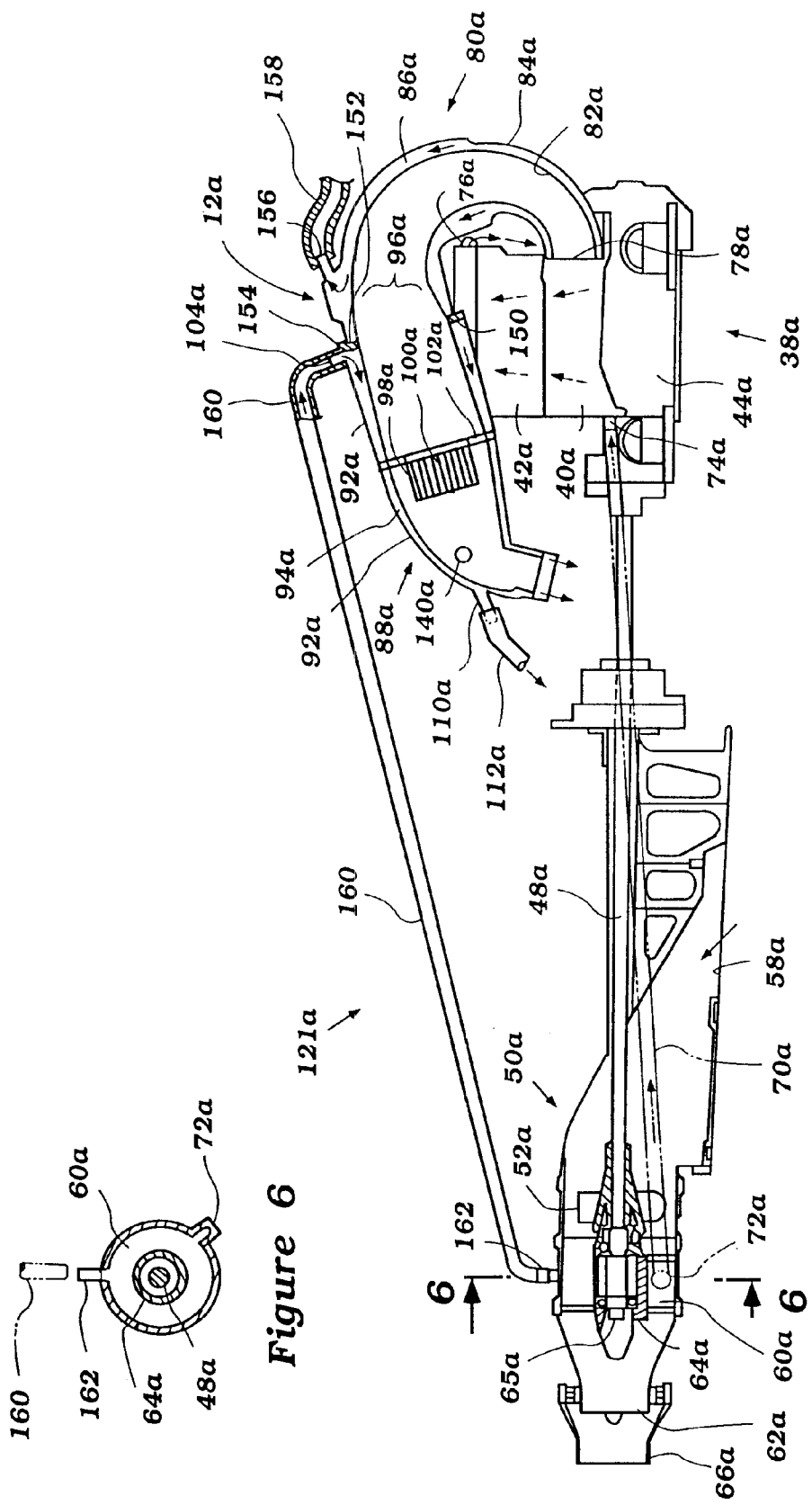

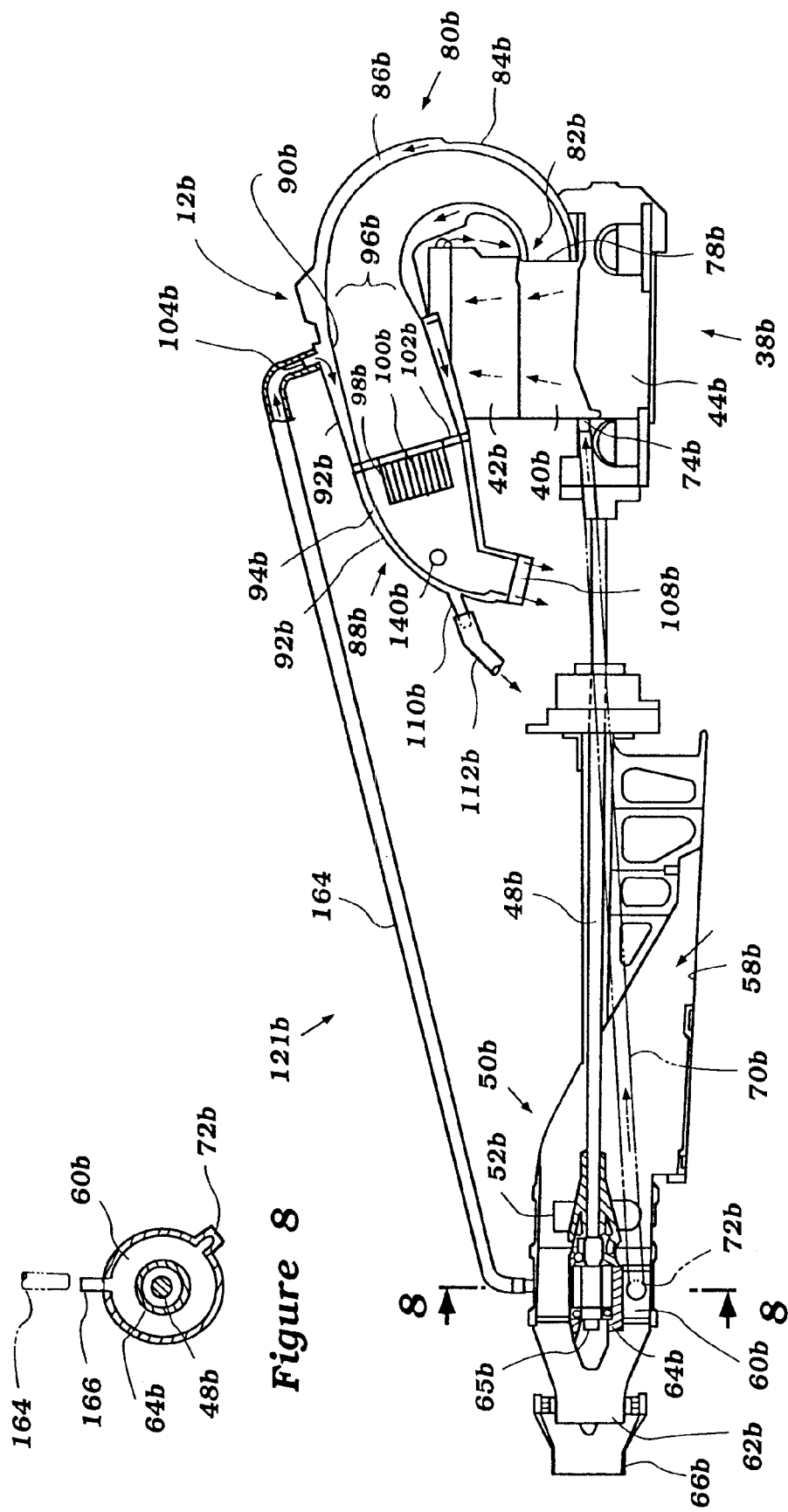

EXHAUST PIPE COOLING SYSTEM FOR WATERCRAFT

CROSS-REFERENCE TO RELATED APPLICATIONS

This application is related to Ser. No. 08/692,875, filed Aug. 2, 1996, which application issued as U.S. Pat. No. 5,788,547 on Aug. 4, 1998.

BACKGROUND OF THE INVENTION

1. Field of the Invention

The present invention relates to an exhaust system for a watercraft, and more particularly to cooling system for an exhaust system of a watercraft.

2. Description of Related Art

Personal watercraft have become very popular in recent years. This type of watercraft is quite sporting in nature and carries a rider and possibly one or two passengers. A relatively small hull of the personal watercraft commonly defines a riders' area above an engine compartment. A two-cycle internal combustion engine frequently powers a jet propulsion unit which propels the watercraft. The engine lies within the engine compartment in front of a tunnel formed on the underside of the watercraft hull. The jet propulsion unit is located within the tunnel and is driven by a drive shaft. The drive shaft usually extends between the engine and the jet propulsion device, through a wall of the hull that forms a front gullet portion of the tunnel.

An exhaust system of the personal watercraft discharges engine exhaust to the atmosphere either through or close to the body of water in which the watercraft is operating. Although submerged discharge of engine exhaust silences exhaust noise, environmental concerns arise. These concerns are particularly acute in connection with two-cycle engines because engine exhaust from two-cycle engines often contains lubricants and other hydrocarbons.

Such environmental concerns have raised a desire to minimize exhaustion of hydrocarbons and other exhaust byproducts (e.g., carbon monoxide and oxides of nitrogen) and thus reduce pollution of the atmosphere and the body of water in which the watercraft is operated. In response to the increased concerns regarding exhaust emissions, several outboard motors recently have become equipped with a catalyst to convert exhaust byproducts to harmless gases.

Catalysts must operate at a relatively high temperature in order to the necessary thermal reaction and burning of the exhaust byproducts. A catalyzer thus desirably operates within a specific range of temperature so as to effectively and efficiently convert engine exhaust into generally harmless gases.

SUMMARY OF THE INVENTION

One aspect of the present invention involves a cooling system for an exhaust system including a catalyzer. The cooling system regulates the temperature of the catalyzer within a desired range of operating temperatures. For this purpose, the cooling system desirably supplies coolant to a cooling jacket around the catalyzers independent of an engine cooling system.

In one application of the present invention, a small watercraft, such as a personal watercraft, is provided with an internal combustion engine. The engine includes at least one exhaust port and an output shaft which drives a propulsion device. An exhaust system extends between the engine exhaust port and a discharge port, and includes a catalyzer to treat exhaust gases from the engine before discharge through the exhaust port. A cooling jacket extends along a portion of the exhaust system in the vicinity of the catalyzer. A coolant supply system communicates with the cooling jacket independent of the engine to cool the catalyzer.

Another aspect of the present invention involves a watercraft comprising an internal combustion engine. The engine has at least one exhaust port and an output shaft which drives a propulsion device. An exhaust system extends between the engine exhaust port and a discharge port, and includes a catalyzer to treat exhaust gases from the engine before discharge through the exhaust port. A cooling jacket extends along a portion of the exhaust system in the vicinity of the catalyzer. A coolant supply system communicates with the cooling jacket and with a source of fresh coolant to directly supply fresh coolant to the cooling jacket.

In accordance with an additional aspect of the present invention, a watercraft is provided having an internal combustion engine disposed within a hull of the watercraft. The engine has at least one exhaust port which communicates with an exhaust system that delivers engine exhaust to a discharge port. A cooling jacket extends along a portion of the exhaust system. The watercraft also includes a bilge system having a bilge pump. The bilge pump communicates with the cooling jacket to pump bilge water from a bilge area of the hull to the cooling jacket to provide additional cooling of the portion of the exhaust system.

Another aspect of the present invention involves a watercraft comprising an internal combustion engine having at least one exhaust port and an output shaft. A jet propulsion device propels the watercraft and is driven by the engine output shaft. An exhaust system extends between the engine exhaust port and an exhaust discharge outlet to discharge exhaust gases from the watercraft. The watercraft also includes an upwardly spraying water discharge nozzle and a water cooling system. The water cooling system includes a water jacket and water supply system which receives water from the jet propulsion unit. The water supply system communicates with both the water jacket and the discharge nozzle, and includes a flow regulator which controls the water flow to the water jacket and to the discharge nozzle.

In accordance with a further aspect of the present invention, a watercraft comprises an internal combustion engine having at least one exhaust port and an output shaft. A jet propulsion device is driven by the engine output shaft to propel the watercraft. An exhaust system extends between the engine exhaust port and an exhaust outlet to discharge exhaust gases from the watercraft. The exhaust system includes at least one water jacket that extends along at least a portion of the exhaust system's length. The watercraft also includes an upwardly spraying water discharge nozzle and a water supply system which communicates with both the discharge nozzle and the exhaust system water jacket. The water supply system receives water from the jet propulsion unit and communicates with the water jacket independent of the engine.

Further aspects, features, and advantages of the present invention will become apparent from the detailed description of the preferred embodiments which follow.

BRIEF DESCRIPTION OF THE DRAWINGS

These and other features of the invention will now be described with reference to the drawings of preferred embodiments of the exhaust pipe cooling system. The different embodiments of the invention are intended to illustrate and not to limit the invention. To assist the reader's understanding of the description of the embodiments which follow, the following provides a brief description of the referenced drawing:

FIG. 3 is a schematic view of the exhaust pipe cooling system of FIG. 1 shown with a portion of an exhaust system, an engine and a jet propulsion unit of the personal watercraft;

FIG. 4 is a cross-sectional view of the jet propulsion unit of FIG. 3 taken along line 4—4;

FIG. 5 is a schematic view of an exhaust pipe cooling system configured in accordance with another embodiment of the present invention, shown with a portion of an exhaust system, an engine and a jet propulsion unit of the personal watercraft;

FIG. 6 is a cross-sectional view of the jet propulsion unit of FIG. 5 taken along line 6—6;

FIG. 7 is a schematic view of an exhaust pipe cooling system configured in accordance with an additional embodiment of the present invention, shown with a portion of an exhaust system, an engine and a jet propulsion unit of the personal watercraft;

FIG. 8 is a cross-sectional view of the jet propulsion unit of FIG. 7 taken along line 8—8.

DETAILED DESCRIPTION OF PREFERRED EMBODIMENTS

Figure 1:
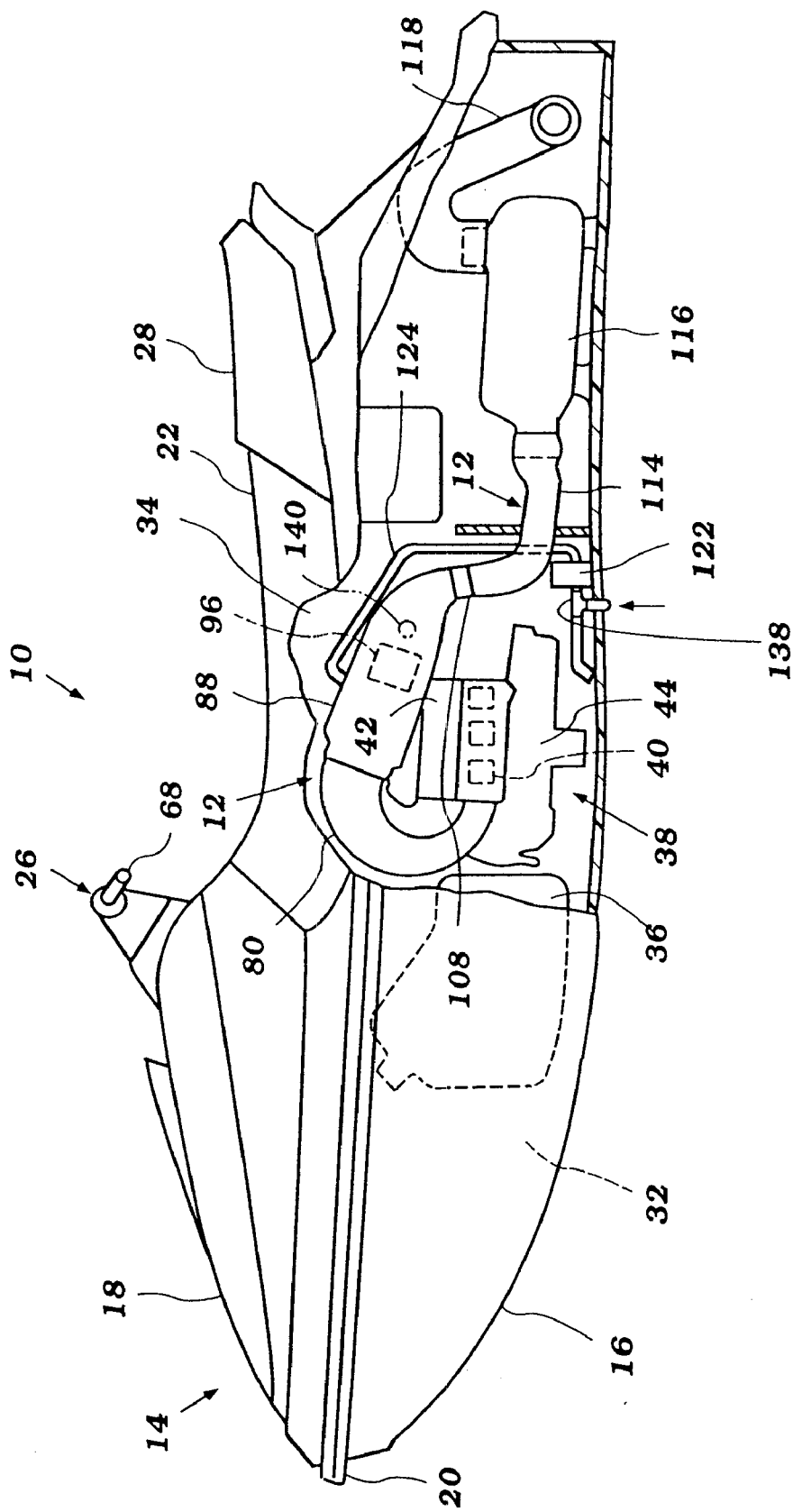
FIG. 1 is a partial sectional, side elevational view of a personal watercraft including an exhaust pipe cooling system configured in accordance with a preferred embodiment of the present invention.
Figure 2:
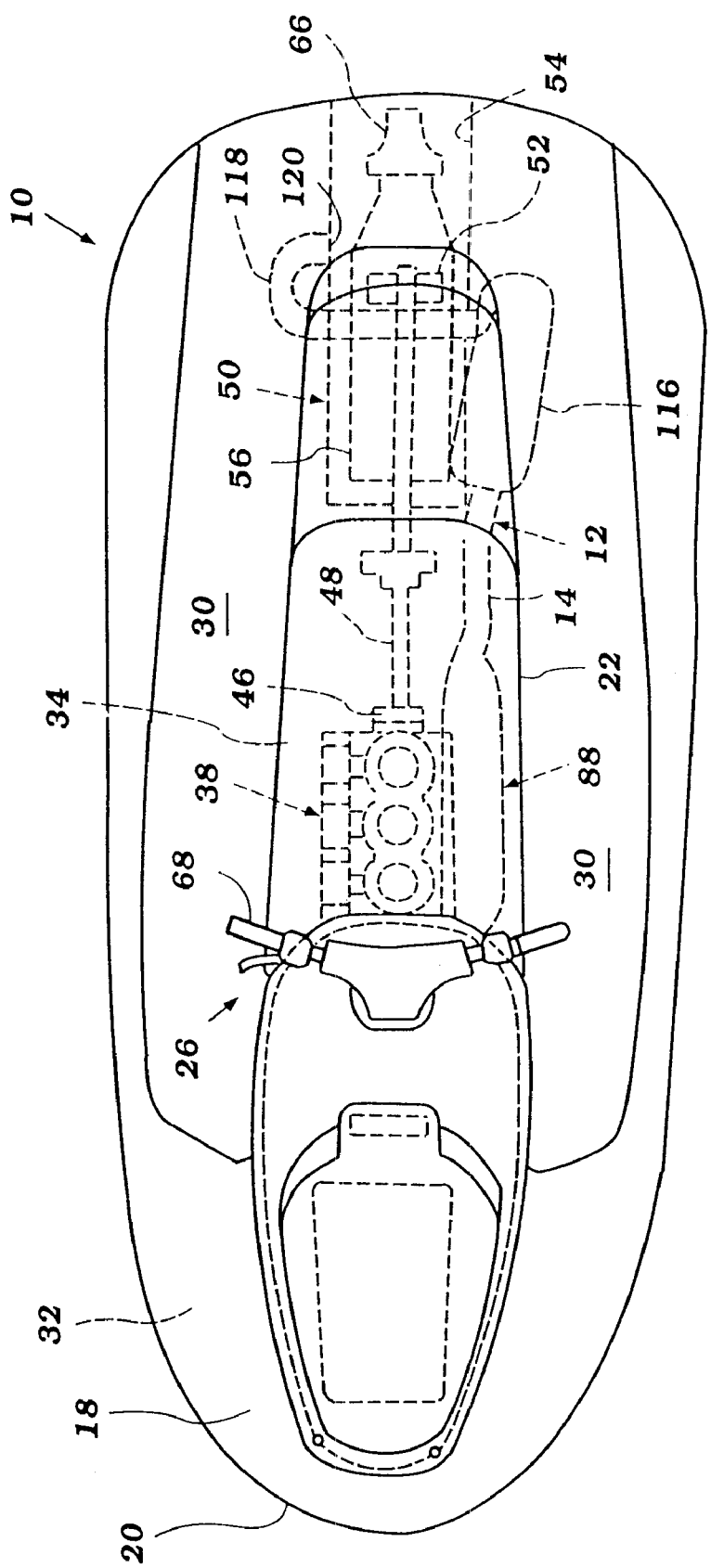
FIG. 2 is top plan view of the watercraft of FIG. 1.

FIGS. 1 and 2 illustrate a personal watercraft 10 which includes an exhaust pipe cooling system configured in accordance with a preferred embodiment of the present invention. Although the present exhaust pipe cooling system is illustrated in connection with an exhaust system 12 for a personal watercraft, the cooling system can be used with other types of watercraft as well, such as, for example, but without limitation, small jet boats and the like.

Before describing the exhaust pipe cooling system, an exemplary personal watercraft 10 will first be described in general details to assist the reader's understanding of the environment of use and the operation of the cooling system. The watercraft 10 includes a hull 14 formed by a lower hull section 16 and an upper deck section 18. The hull sections 16, 18 are formed from a suitable material such as, for example, a molded fiberglass reinforced resin. The lower hull section 16 and the upper deck section 18 are fixed to each other around the peripheral edges 20 in any suitable manner.

A passenger seat 22 is provided proximate to the stern of the hull 14. The passenger seat 22 is mounted longitudinally along the center of the watercraft 10. In the illustrated embodiment, the seat 22 has a longitudinally extended straddle-type shape which may be straddled by an operator and by at least one or two passengers. A forward end 24 of the seat 22 lies proximate to the controls 26 of the watercraft 10 which generally lie at about the longitudinal center of the watercraft 10. This position of the operator on the watercraft 10 gives the watercraft fore and aft balance when the operator rides alone. A rear portion 28 of the seat 22 is configured to allow one or two passengers to be comfortably seated behind the operator of the watercraft 10. The seat 22 desirably includes a removable seat cushion to increase the comfort of the operator and the passengers.

As seen in FIG. 2, the upper deck section 18 of the hull 14 advantageously includes foot areas 30. The foot areas 30 extend generally longitudinally and parallel to the sides of the elongated seat 22 so that the operator and any passengers sitting on the seat 22 can place their feet in the foot areas 30. A non-slip surface (not shown) is located in the foot areas 30 to provide increased grip and traction for the operator and the passengers.

The lower hull section 16 of the personal watercraft 10 includes a forward compartment 32 and a rear compartment 34. In the exemplary watercraft depicted in FIG. 1, a fuel tank 36 and a buoyant block (not illustrated) are located in the forward compartment 32. The buoyant block affords additional buoyancy to the watercraft 10.

An internal combustion engine 38 powers the watercraft 10. The engine 38 is contained within the rear compartment 34 and is mounted primarily beneath the forward portion of the seat 22. Engine mounts secure the engine 38 to the hull lower portion 16 in a known manner.

In the illustrated embodiment, the engine 38 includes three in-line cylinders and operates on a two-stroke crankcase compression principle. This engine type, however, is merely exemplary. Those skilled in the art will readily appreciate that the present exhaust pipe cooling system can be used with any of a variety of engine types having other number of cylinders, having other cylinder arrangements and operating on other combustion principles (e.g., four-stroke principle).

A cylinder block 40 and a cylinder head assembly 42 desirably form the cylinders of the engine 38. Pistons reciprocate within the cylinders of the engine 38 and drive an output shaft, such as a crankshaft, in a known manner. The crankshaft desirably is journaled within a crankcase 44, which in the illustrated embodiment is located beneath the cylinder block 40.

A conventional induction system supplies a fuel/air charge to a plurality of crankcase chambers formed within the crankcase 40. The induction system of the engine 38 includes at least one charge former that receives fuel from the fuel tank 36.

The crankcase chambers of the engine 38 are sealed from one another with each crankcase chamber communicating with a dedicated combustion chamber. The combustion chamber is defined by the corresponding cylinder bore, piston and cylinder head. Because the internal details of the engine 38 desirably are conventional, a further description of the engine construction is not believed necessary to understand and practice the invention.

As seen in FIG. 2, a coupling 46 interconnects the engine crankshaft to an impeller shaft 48. If the engine output shaft is vertically disposed, the impeller shaft 48 will be driven through a bevel gear transmission or a similar transmission. The propeller shaft extends rearward to a jet propulsion unit 50 and drives an impeller 52 of the unit 50.

With reference to FIGS. 2–4, the jet propulsion unit 50 is positioned in a tunnel 54 in the rear center of the lower hull section 16. The propulsion unit 50 includes a gullet 56 having an inlet opening 58 formed on the bottom side of the lower hull section 16. The gullet 56 extends from the inlet opening 58 to a pressurization chamber 60. The pressurization chamber 60 in turn communicates with a nozzle section 62 of the propulsion unit 50.

As best seen in FIG. 3, the impeller 52 is located toward the front end of the chamber 60. A central support 64 supports the rear end of the impeller shaft 48 behind the impeller 52 and generally at the center of the pressurization chamber 60. A bearing assembly 65 journals the rear end of the impeller shaft 48 within the support 62.

The rotating impeller 52, which the impeller shaft 48 drives, pressurizes the water within the chamber 60 and forces the pressurized water through the nozzle section of the propulsion unit 50. A steering nozzle 66 directs the exit direction of the water stream exiting the jet propulsion unit 50. The steering nozzle 66 is pivotally supported at the rear of the jet propulsion unit 50 to change the thrust angle on the watercraft 10 for steering purposes as is known in the art.

With reference to FIG. 2, the steering nozzle 66 is connected to a steering handle 68. The steering handle 68 forms part of the operator controls 26 which are mounted in front of the operator seat 22 as noted above. The steering handle 68 also can include a throttle control for controlling the speed of the engine.

The personal watercraft 10 so far described is conventional and represents only an exemplary watercraft on which the present exhaust pipe cooling system can be employed. A further description of the personal watercraft 10 therefore is not believed necessary for an understanding and an appreciation of the present exhaust pipe cooling system. The exhaust and cooling systems, which are desirably used with the engine 38, will now be described in detail.

The propulsion unit 50 supplies cooling water through a conduit 70 to an engine cooling jacket (which FIG. 3 schematically illustrates). For this purpose, as best seen in FIGS. 3 and 4, an outlet port 72 is formed on the housing the pressurization chamber 60 of the jet pump 50. The conduit 70 is coupled to the outlet port 72 and extends to an inlet port 74 to the engine water jacket. In the illustrated embodiment, the inlet port 74 lies at the lower rear end of the engine 38.

The engine cooling jacket extends through cylinder block 40, about the cylinders, and through the cylinder head assembly 42. The cylinder head 42 includes a coolant discharge port 76 through which the cooling water exits the engine 38.

The exhaust system 12 discharges exhaust byproducts from the engine 38 to the atmosphere and/or to the body of water in which the watercraft 10 is operated. As best seen in FIGS. 1 and 3, the exhaust system 12 includes an exhaust manifold that is affixed to the side of the cylinder block 40 and which receives exhaust gases from the combustion chambers through exhaust ports in a well-known manner.

An outlet end 78 of the exhaust manifold communicates with a C-shaped pipe section 80. This C-pipe 80 includes an inner tube 82 that communicates directly with the discharge end 78 of the exhaust manifold. An outer tube 84 surrounds the inner tube 82 to form a water jacket 86 between the inner and outer tubes 82, 84. As schematically illustrated in FIG. 3, the water jacket 86 communicates with the discharge port 76 of engine water jacket.

The outlet end of the C-pipe 80 communicates with an expansion chamber 88. The expansion chamber 88 has a dual shell construction formed by an inner shell 90 which defines an expansion chamber volume. The inner tube 82 of the C-pipe 80 communicates with the expansion chamber volume.

An outer shell 92 is connected to the inner shell 90 and defines a cooling jacket 94 about the inner shell 90. The water jacket 94 of the expansion chamber 88 communicates with the water jacket 86 of the C-pipe 80 to receive cooling water from the engine 38.

The expansion chamber 88 desirably houses a catalyzer 96. In the illustrated embodiment, the catalyzer 96 includes an annular shell 98 supporting a honeycomb-type catalyst bed 100. The catalyst bed 100 is formed of a suitable catalytic material such as that designed to treat and render harmless hydrocarbons, carbon monoxide, and oxides of nitrogen. An annular flange 102 supports the annular shell 98 generally at the center of the flow path through the expansion chamber volume. In this manner, all exhaust gas flow through the expansion chamber 88 passes through the catalyst bed 100.

In the illustrated embodiment, the annular flange 102 is held between upper and lower sections of the expansion chamber 88. Each section of the expansion chamber 88 includes the dual shell construction described above. The annular flange 102 also includes a plurality of apertures which place the cooling jackets 94 of the upper and lower sections of the expansion chamber 88 in communication with each other.

The water jacket 94 of the upper section receives cooling water from the water jacket 86 of the C-pipe 80. The upper section of the expansion chamber 88 also includes an inlet port 104 which receives cooling water from the exhaust pipe cooling system, which will be described in detail below.

The lower section of the expansion chamber 88 includes a downwardly turned portion 106 that terminates at a discharge end 108. As seen in FIG. 3, the inner shell 90 stops short of the outer shell 92 such that the water flow through the water jacket 94 merges with the exhaust gas flow through the expansion chamber volume at the discharge end 108.

The lower section of the expansion chamber 88 also includes a discharge port 110. The discharge port is positioned just up stream of the discharge end 108. In this position, a portion of the cooling water flowing through the expansion chamber water jacket 94 flows through a discharge line 112 rather than through the exhaust pipe.

With reference to FIGS. 1 and 2, a flexible pipe section 114 is connected to the discharge end 108 of the expansion chamber 88 and extends rearward along one side of the watercraft hull tunnel 54. The flexible conduit 114 connects to an inlet section of a water trap device 116. The water trap device 116 also lies within the watercraft hull 16 on the same side of the tunnel 54.

The water trap device 116 has a sufficient volume to retain water and to preclude the back flow of water to the expansion chamber 88 and the engine 38. Internal baffles within the water trap device 116 help control water flow through the exhaust system 12.

An exhaust pipe 118 extends from an outlet section of the water trap device 116 and wraps over the top of the tunnel 54 to a discharge end 120. The discharge end 120 desirably opens into the tunnel 54 at an area that is close to or actually below the water level with the watercraft 10 floating at rest on the body of water.

With reference to FIGS. 1 and 3, the present exhaust pipe cooling system 121 supplies fresh cooling water to the inlet port 104 of the water jacket 94 that surrounds the expansion chamber 88. For this purpose, in the illustrated embodiment the cooling system 121 includes a mechanical pump 122 which is driven by an electric motor. The pump 122 desirably functions as a bilge pump and draws water from the bilge area within the watercraft hull 16. The pump 122 also functions independent of the jet propulsion device 50 and in some applications continuously draws water from the bilge area. In this manner, the pump 122 delivers cooling water to the inlet port 104 of the expansion chamber water jacket 94 through a delivery line 124, which is connected to an effluent port 126 of the pump 122.

A pickup conduit 128 extends from the pump 122 to a water trap device 130. The pickup conduit 128 is connected to an influent port 132 of the pump 122.

In the illustrated embodiment, the water trap device 130 includes a well formed in the lower hull section 16 at a point beneath the engine 38. Other types of water trap devices, however, can be employed at the pickup end of the conduit 128. Water from the bilge area flows into the water trap device 130. The water trap device 130 desirably is configured to contain a volume of water from the bilge area and to inhibit the flow of water from the water trap device 130 back to the bilge area upon abrupt changes in the direction of travel of the watercraft 10. In this manner, the bilge pump 122 remains primed and does not run dry when the watercraft 10 abruptly changes direction.

The pump 122 also communicates with an auxiliary water pickup port 134. In the illustrated embodiment, the pickup port 134 is located through a wall of the lower hull section 16. The pump 122 draws water into a pickup line 136, which is connected to the port 134, from the body of water in which the watercraft 10 is operating.

A control valve 138 (e.g., a solenoid valve) regulates water flow through the pickup line 136. In the illustrated embodiment, the control valve 138 is a three-way valve which regulates water flow through two inlet ports. One inlet port is connected to the pickup conduit 128 and the other inlet port is connected to the auxiliary water pickup line 136. The outlet port communicates with the pump 122.

An electronic control system of the watercraft 10 controls the operation of the control valve 138 depending upon the exhaust gas temperature at the catalyst bed 100 within the expansion chamber 88. FIG. 3 schematically illustrates this electronic control system.

A temperature sensor 140 is located within the exhaust expansion chamber 88 to determine the temperature of the exhaust gases flowing through the catalyst bed 100, which is generally indicative of the catalyst bed temperature. In the illustrated embodiment, the temperature sensor 140 is located on the downstream side of the catalyst bed 100 just before the down-turn section 106 of the expansion chamber 88. The temperature sensor 140 measures the temperature of the exhaust gases at this location and generates an electrical signal indicative of the sensed temperature.

An electronic control unit (ECU) 142 of the control system receives the signal from the temperature sensor 140. The ECU then compares the sensed temperature against a predetermined desired operational temperature range for the particular catalyst bed 100, which is stored within a memory device of the ECU. In the event that the sensed exhaust temperature approaches or exceeds the upper limit of the desired operational temperature range, the ECU opens the control valve 138 to introduce more fresh cooling water into the water jacket 94 which surrounds the catalyzer 96. The fresh cooling water has a substantially lower temperature than the water flowing through the cooling jacket 94 from the engine cooling jacket. The lower-temperature water consequently absorbs more heat to reduce the temperature within the expansion chamber 88 and thus the temperature of the catalyst bed 100.

During high temperature conditions when the control valve 138 is opened, the ECU 142 also lights a warning lamp 144 positioned at the operators control 26 (FIG. 1) to indicate the elevated running temperature of the engine exhaust system 12. The warning light 144 allows the operator to reduce the engine speed to help cool the exhaust system 12.

The ECU 142 additionally signals an engine speed control circuit 146. The engine speed control circuit 146 retards engine speeds especially when the throttle is held wide open. This effect further helps reduce the temperature of the exhaust system 12.

In this manner, the present exhaust pipe cooling system 121 maintains the temperature of the catalyzer 96 within a desired range of operating temperatures. The cooling system 121 also inhibits damage to the catalyst bed 100 due to overheating.

FIGS. 5 and 6 illustrate an exhaust pipe cooling system which is configured in accordance with another embodiment of the present invention. The cooling system of the embodiment of FIGS. 5 and 6 is substantially identical to that described above, except that the cooling system cooperates with the jet propulsion device rather than using a separate pump. The construction of the water jackets about the expansion chamber also differ. To ease the reader's understanding of the present embodiment, like reference numerals with an "a" suffix are used to indicate similar parts of the two embodiments.

As seen in FIG. 5, the expansion chamber 88a includes a header 150 formed at its upstream end. The inner and outer shells 90a, 92a are connected to the header 150. The C-pipe also includes a header 152 formed at its downstream end into which the inner and outer tubes 82a, 84a terminate. The corresponding headers 150, 152 of the expansion chamber 88a and the C-pipe 80a mate together when assembled with a gasket 154 interposed there between. The gasket 154 seals the junction between the C-pipe 80a and the expansion chamber 88a such that the exhaust path continuously extends from the C-pipe 80a into the expansion chamber 88a.

The headers 150, 152, however, prevent fluidic communication between the water jackets 86a, 94a of the C-pipe 80a and the expansion chamber 88a. As such, the C-pipe 80a includes an outlet port 156 through which cooling water from the engine 38 is discharged from the watercraft 10 through a discharge conduit 158. Cooling water into the water jacket 94a about the expansion chamber 88a thus must flow through the inlet port 104a.

A water conduit line 160 extends between the pressurization chamber 60a of the jet propulsion unit 50a and the inlet port 104a on the expansion chamber 88a of the engine exhaust system 12a. In the illustrated embodiment, as seen in FIG. 6, the pressurization chamber 60a includes a nipple 162 to which an end of the water conduit 160 can be releasably attached by a hose clamp or a quick-connect coupling. The nipple 162 desirably is located on the upper side of the chamber 60a and is spaced apart from the port 72a to which the engine water jacket conduit 70a is attached.

The end of the water conduit 160 also can be designed to be easily coupled to a conventional garden or utility hose. This would allow a user to conveniently flush the cooling system after use, especially when the watercraft 10 is run in salt water.

In the illustrated embodiment, pressurized water from the chamber 60a continuously flows through the water conduit 160. The water conduit 160 delivers water to the expansion chamber water jacket 94a to cool the catalyst bed 100a.

More water flows through the conduit 160 as engine speed increases because of the resulting increase in pressure within the chamber 60a. The flow rate through the conduit 160 thus depends upon the engine speed which also is proportional to exhaust temperature. The present cooling system 121a thus self-regulates itself to maintain the exhaust gas temperature generally within a desired range of operating temperature.

Although not illustrated, if more precise control over the temperature within the expansion chamber 88a is desired, a control system can operate a control valve to regulate water flow through the water conduit 160. The control valve can be located at the pressurization chamber 60a or anywhere along the length of the water conduit 160. The control system also involves a temperature sensor 140a which measures the temperature within the expansion chamber 88a and sends a signal indicative of the temperature to an ECU of the control system. The ECU operates the control valve in the manner described above. In addition, the ECU can control an engine speed control circuit and can operate an indicator light as described above.

The cooling water from the water conduit 160 flows into a water jacket 94a of the expansion chamber 88a and about the periphery of the expansion chamber volume in which the catalyzer 96a is located. The fresh cooling water absorbs heat from the inner shell 90a of the expansion chamber 88a and carries the heat away to decrease the temperature of the catalyzer 96a. A portion of the cooling water flows through the outlet port 100a to reduce the amount of water that merges with the exhaust gas flow downstream of the catalyst bed 100a. This helps protect the catalyst bed 100a should the watercraft become partially or entirely inverted.

FIGS. 7 and 8 illustrate an additional embodiment of the present exhaust pipe cooling system which is designed for use in emergency circumstances. Many of the components of the embodiment of these figures are similar to those described above in connection with the embodiment of FIGS. 3 and 4, and thus, the above description should be understood as applying equally to the present embodiment, unless indicated to the contrary. For this purpose, like reference numerals with a "b" suffix are used to indicate like parts between the two embodiments.

The cooling system 121b includes a temperature sensor 140b. The temperature sensor 140b is located within the expansion chamber 88b proximate to the catalyzer 96b. The temperature sensor 140b determines the temperature of the exhaust gases within the expansion chamber 88b and generates a signal indicative of the temperature. An ECU of a control system receives this information and compares it to a preset range of operating temperatures for the catalyst bed 100b. If the measured temperature approaches or exceeds the upper range of this preset temperature range, the ECU lights an indicator light to signal the operator of the watercraft of the abnormal temperature within the exhaust system 12b.

The user can introduce fresh cooling water into the cooling jacket 94b about the expansion chamber 88b by use of a detachable hose 164. For this purpose, the pressurization chamber 60b of the jet propulsion device 50b includes an outlet port 166 and the expansion chamber includes an inlet port 104b which communicates with the water jacket 94b. In the illustrated embodiment, the outlet port 166 of the chamber 60b desirably includes a quick-connect coupling which remains normally closed. For instance, a ball-type valve or a cap closes the outlet port 166 under normal conditions. The coupling desirably lies on the upper side of the chamber 60b for easy access.

The inlet port 104b also desirably includes a quick-connect coupling which remains normally closed by any of a variety of conventional means, including, but not limited to, a rotatable or spring-load ball valve or a cap. The coupling is positioned on the upper side of the expansion chamber 88b also for easy access.

Cooling water normally flows from the engine water jacket, through the water jacket 86b of the C-pipe 80b and into the water jacket 94b of the expansion chamber 88b. A portion of the water is diverted from the water jacket through a discharge port 110b on the expansion chamber 88b and is dumped overboard through a discharge conduit 112b. The balance of the cooling water merges with the exhaust gas flow through the exhaust system and is discharged at the discharge end 108b of the expansion chamber 88b.

Under abnormally high operating temperatures, the operator can connect the detachable hose 164 between the outlet port 166 on the jet pump 50b and the inlet port 104b of the expansion chamber water jacket 94b. The hose 162 desirably includes corresponding quick-connect couplings at its ends which cooperate with the quick-connect couplings at the jet pump outlet port 166 and at the expansion chamber inlet port 104b.

Pressurized water from the jet pump chamber 60b flows through the hose 164 and into the expansion chamber water jacket 94b. This fresh cooling water merges with the cooling water from the engine 38 to reduce the temperature of the catalyst bed 100b in the manner described above. Once a normal operating temperature has resumed, the operator may detach the hose 164 and close the corresponding ports 166, 104b.

This detachable coupling of an auxiliary water supply also provides a way to conveniently flush the cooling system of the watercraft exhaust system, especially after use in salt water. The hose 164 can be connected to a source of fresh water (e.g., a garden hose) to run fresh water through the water jackets of the exhaust system and the engine.

Figure 9:
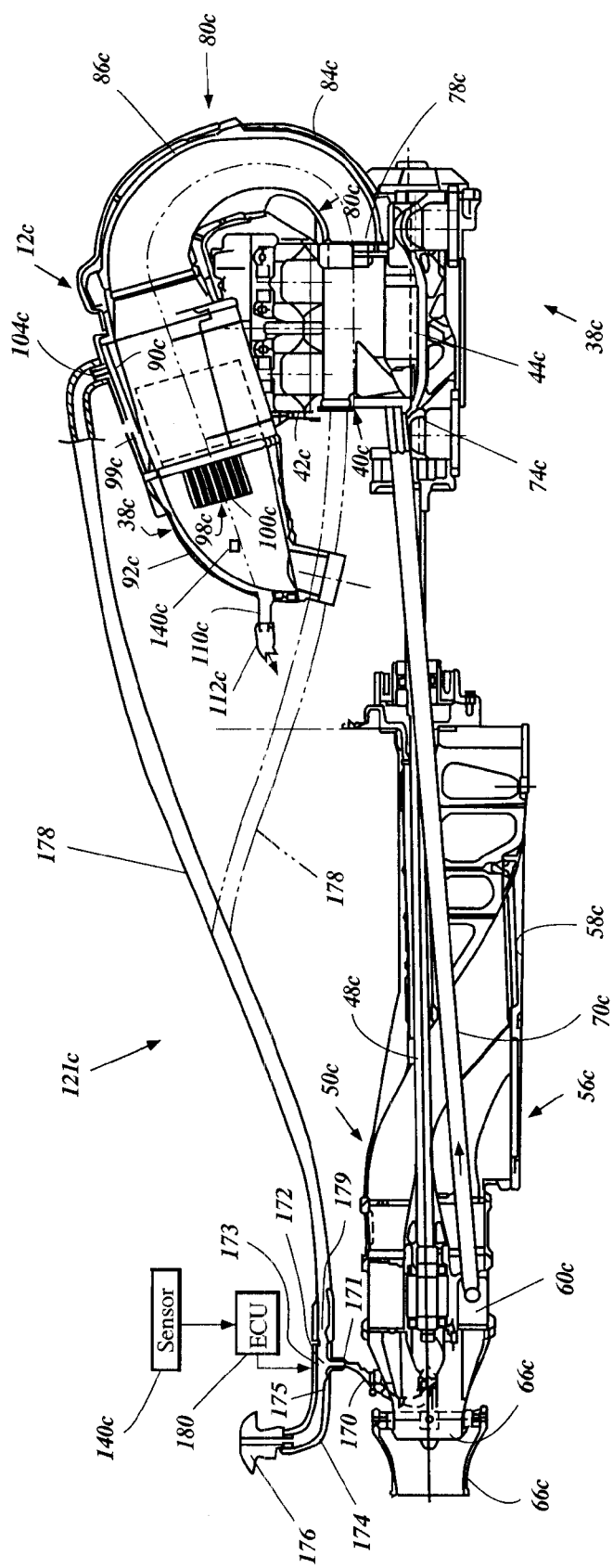
FIG. 9 is a schematic view of an exhaust pipe cooling system configured in accordance with an additional embodiment of the present invention, shown with a portion of an exhaust system, an engine and a jet propulsion unit of the personal watercraft.

FIG. 9 illustrates an additional embodiment of the present exhaust pipe cooling system, indicated generally by the reference numeral 121c. Many of the components of the embodiment depicted in this figure are similar to those described above in connection with the embodiments of FIGS. 3 and 4. Thus, the above description should be understood as applying equally to the present embodiment, unless indicated to the contrary. For this purpose, like reference numeral, with a "c" suffix, are used to indicate like parts between the embodiments.

The exhaust pipe cooling system 121c includes a supply conduit 170 that connects the pressurization chamber 60c of the jet propulsion unit 50c with an inlet port 171 of a three-way control valve 172. A first water delivery conduit 174 connects a first outlet port 175 of the control valve 172 to an upwardly spraying discharge nozzle 176. A second water delivery conduit 178 connects a second outlet port 179 of the control valve 172 to the inlet port 104c of the expansion chamber 88c for delivering fresh cooling water to the water jacket 94c of the expansion chamber 88c.

As understood from FIG. 9, the upwardly spraying discharge nozzle 176 is desirably arranged on an aft end of the watercraft 10, preferably at a position near the jet propulsion unit 50. The discharge nozzle 176 is oriented so that the upward spray of water will be visible from a distance. The resulting "rooster tail" provides an indicator of the watercraft's presence which is easily visible. For this purpose, the discharge nozzle 176 can be positioned on the side or the transom of the watercraft 10, or can be provided on a rear deck of the watercraft 10, directly behind the longitudinally extending center seat 22.

A valve member 173 operates within the body of the valve 172 and regulates water flow through the first and second water delivery conduits 174, 178 by at least partially or fully blocking water flow through one or both of its two outlet ports 175, 179. In FIG. 9, the control valve 172 is shown in a position directing the fresh water to flow from the supply conduit 170 to the second water conduit 178. The control valve 172, however, desirably is provided in a normal position that causes at least the majority, if not all, of the water to flow from the supply conduit 170 to the first delivery conduit 174. In this valve position, the upwardly spraying discharge nozzle 176 receives a sufficient amount of water from the supply conduit 170 to produce a "rooster tail" that projects above the watercraft 10.

The cooling system 121c also includes a temperature sensor 140c. The temperature sensor 140c is located downstream and proximate to the catalyst bed 100c of the catalyzer 96c. The temperature sensor 140c determines the temperature of the exhaust gases within the expansion chamber 88c and generates a signal indicative of the temperature. An ECU 180 of a control system receives this information and compares it to a preset range of operating temperatures for the catalyst bed 100c. If the measure temperature approaches or exceeds the upper range of the preset temperature range (i.e., a preset upper temperature limit), the ECU 180 causes the control valve 172 to increase the water flow through the second water delivery line 178. For instance, if the valve member 173 normally closes the second delivery line 178, the ECU 180 causes the valve member 173 to at least partially, if not fully open, via a conventional valve actuating mechanism (not shown). In a partially or fully open position, fresh water from the jet propulsion unit 50c flows through the second delivery conduit 178 toward the water jacket 94c. The water thence flow through the inlet port 104c and into the water jacket 94c, which surrounds the catalyzer 96c. The fresh cooling water has a substantially lower temperature than the water flowing through the cooling jacket 94c from the engine cooling jacket. The lower temperature water consequently absorbs more heat so as to reduce the temperature within the expansion chamber 88c and thus, the temperature of the catalyst bed 100c.

The ECU 180 can also control an engine speed control circuit and operate an indicator light as described above.

As illustrated by phantom lines in FIG. 9, instead of connecting the second water conduit 178 to the inlet port 104c of the cooling jacket 94c for maintaining the temperature of the catalyzer 96c within a desired range of operating temperatures, the water conduit 178 can be connected to an inlet port (not shown) on the exhaust manifold (either to the same port that the primary water delivery line 70c is connected to or to a separate port). This increases the flow rate of cooling water through the water jackets when an abnormally high temperature of the exhaust system is sensed. When the water conduit 178 is connected to the inlet of the exhaust manifold, fresh cooling water supplied by the water conduit 178 flows from the inlet port of the exhaust manifold first through the cooling jacket of the engine 44c and then through the water cooling jackets 86c, 94c of the exhaust system 12c. Thus, the water conduit 178 supplies fresh cooling water to the engine 44c in addition to the fresh cooling water supplied by the primary water supply conduit 70c. Connecting the water conduit 178 to the inlet port of the exhaust manifold instead of connection the water conduit 178 to the inlet port 104c of the expansion chamber 88c not only allows the temperature of the catalyzer 96c to be maintained in a desired range of operating temperatures, but it improves engine cooling as well.

In the majority of the above-described embodiments, the cooling system introduces fresh cooling water into the water jacket surrounding the expansion chamber and the catalyzer independent of the engine block cooling system. The fresh coolant helps maintain the catalyzer below an upper operating temperature in order for the catalyzer to operate effectively and efficiently and to prevent damage to the catalyst bed. In some of the embodiments, the operating temperature is regulated further by controlling the flow rate of fresh coolant into the expansion chamber water jacket or engine block cooling jacket.

Although this invention has been described in terms of certain preferred embodiments, other embodiments apparent to those of ordinary skill in the art are also within the scope of this invention. Accordingly, the scope of the invention is intended to be defined only by the claims that follow.

What is claimed is:

1. A watercraft comprising an internal combustion engine having at least one exhaust port and an output shaft, a jet propulsion device driven by the engine output shaft, an exhaust system extending between the engine exhaust port and an exhaust discharge outlet to discharge exhaust gases from the watercraft, an upwardly spraying discharge nozzle formed separate from the jet propulsion device, a sensor configured to detect an operational parameter of the engine, and a water cooling system including a water jacket and a water supply system receiving water from the jet propulsion unit and communicating with both the water jacket and the discharge nozzle, said water supply system comprising a flow regulator which is disposed upstream of the discharge nozzle and the water jacket and is configured to supply water from the jet propulsion unit to both the water jacket and to the discharge nozzle in accordance with an output of the sensor.

2. A watercraft as in claim 1, wherein said water jacket extends along a portion of the exhaust system.

3. A watercraft as in claim 1, wherein the upwardly spraying discharge nozzle is positioned near the jet propulsion unit at an aft end of the watercraft.

4. A watercraft comprising an internal combustion engine having at least one exhaust port and an output shaft, a jet propulsion device driven by the engine output shaft, an exhaust system extending between the engine exhaust port and an exhaust discharge outlet to discharge exhaust gases from the watercraft, an upwardly spraying discharge nozzle formed separate from the jet propulsion device, a sensor configured to detect an operational parameter of the watercraft, and a water cooling system including a water jacket and a water supply system receiving water from the jet propulsion unit and communicating with both the water jacket and the discharge nozzle, said water supply system comprising a flow regulator which controls water flow to the water jacket and to the discharge nozzle in accordance with an output of the sensor, wherein said water jacket extends along a portion of the exhaust system and the exhaust system includes a catalyzer to treat exhaust gases from the engine before discharge through the exhaust outlet, and the water jacket juxtaposes the catalyzer.

5. A watercraft comprising an internal combustion engine having at least one exhaust port and an output shaft, a jet propulsion device driven by the engine output shaft, an exhaust system extending between the engine exhaust port and an exhaust discharge outlet to discharge exhaust gases from the watercraft, an upwardly spraying discharge nozzle formed separate from the jet propulsion device, a water cooling system including a water jacket and the water supply system receiving water from the jet propulsion unit and communicating with both the water jacket and the discharge nozzle, said water supply system comprising a flow regulator which controls water flow to the water jacket and to the discharge nozzle, and a control system comprising a temperature sensor located at a position to determine the temperature of a portion of the exhaust system, and a controller operating the flow regulator in response to the sensed temperature of the portion of the exhaust system.

6. A watercraft as in claim 5, wherein the exhaust system includes a catalyzer disposed within the portion of the exhaust system which the temperature sensor senses so as to determine the temperature of the catalyzer, and at least a portion of the water jacket is positioned to juxtapose the catalyzer.

7. A watercraft comprising an internal combustion engine having at least one exhaust port and an output shaft, a jet propulsion device driven by the engine output shaft, an exhaust system extending between the engine exhaust port and an exhaust discharge outlet to discharge exhaust gases from the watercraft, an upwardly spraying discharge nozzle formed separate from the jet propulsion device, and a water cooling system including a water jacket and the water supply system receiving water from the jet propulsion unit and communicating with both the water jacket and the discharge nozzle, said water supply system comprising a flow regulator which controls water flow to the water jacket and to the discharge nozzle, wherein the flow regulator includes at least a three-way valve having an inlet port and two outlet ports, the inlet port is connected to jet propulsion device, one of the outlet ports is connected to the upwardly spraying discharge nozzle via a first delivery conduit, and the other outlet port is connected to the water jacket via a second delivery conduit.

8. A watercraft as in claim 7, wherein the exhaust system includes a catalyzer to treat exhaust gases from the engine before discharge through the exhaust outlet, and one end of the second delivery conduit communicates with the water jacket upstream of the position of the catalyzer in the exhaust system.

9. A watercraft as in claim 8, wherein one end of the second delivery conduit is connected to the water jacket in the vicinity of the catalyzer.

10. A watercraft as in claim 8, wherein the exhaust system includes an exhaust manifold which receives exhaust gases from the engine exhaust port, and one end of the second delivery conduit is connected to the exhaust manifold.

11. A watercraft comprising an internal combustion engine having at least one exhaust port and an output shaft, a jet propulsion unit driven by the engine output shaft, an exhaust system extending between the engine exhaust port and an exhaust outlet to discharge exhaust gases from the watercraft, the exhaust system including at least one water jacket that extends along at least a portion of the exhaust system, an upwardly spraying water discharge nozzle formed separate from the jet propulsion device, and a water supply system receiving water from the jet propulsion unit and communicating with both the water jacket and the discharge nozzle, the water supply system communicating with the water jacket independent of the engine, wherein the exhaust system includes a catalyzer to treat exhaust gases from the engine before discharge through the exhaust outlet, and the water supply system includes a first delivery conduit which is connected to the water jacket upstream of the position of the catalyzer in the exhaust system, wherein the first delivery conduit is connected to the water jacket in the vicinity of the catalyzer, and wherein the multi-path junction includes a valve which operates to regulate water flow through the first and second junctions.

12. A watercraft as in claim 11 additionally comprising a control system including a temperature sensor located at a position in the exhaust system near the water jacket, and a controller receiving a signal from the temperature sensor which is indicative of the exhaust system temperature at a location cooled by the water jacket, the controller operating the valve to regulate water flow to the water jacket.

13. A watercraft as in claim 11, wherein the controller operates the valve to direct a greater flow of water to the upwardly spraying discharge nozzle than to the water jacket when the sensed temperature is below a preset temperature limit.

14. A watercraft as in claim 13, wherein the upwardly spraying discharge nozzle is positioned near the jet propulsion unit at an aft end of the watercraft.

15. A watercraft as in claim 11, wherein the upwardly spraying discharge nozzle is positioned near the jet propulsion unit at an aft end of the watercraft.

16. A watercraft comprising an internal combustion engine having at least one exhaust port and an output shaft, a jet propulsion unit driven by the engine output shaft, an exhaust system extending between the engine exhaust port and an exhaust outlet to discharge exhaust gases from the watercraft, the exhaust system including at least one water jacket that extends along at least a portion of the exhaust system, an upwardly spraying water discharge nozzle formed separate from the jet propulsion device, and a water supply system receiving water from the jet propulsion unit and communicating with both the water jacket and the discharge nozzle, the water supply system communicating with the water jacket independent of the engine, wherein the exhaust system includes a catalyzer to treat exhaust gases from the engine before discharge through the exhaust outlet, and the water supply system includes a first delivery conduit which is connected to the water jacket upstream of the position of the catalyzer in the exhaust system, wherein the first delivery conduit is connected to the water jacket in the vicinity of the catalyzer, and wherein the exhaust system includes an exhaust manifold attached to the engine and arranged to receive exhaust gases from at least the exhaust port, and the first conduit is connected to the exhaust manifold.

17. A watercraft comprising a hull having a deck portion, an internal combustion engine having at least one exhaust port and an output shaft, a jet propulsion including an outlet aperture and being driven by the engine output shaft, an exhaust system extending between the engine exhaust port and an exhaust discharge outlet to discharge exhaust gases from the watercraft, an upwardly spraying discharge nozzle formed separate from the jet propulsion device, a sensor configured to detect an operational parameter of the watercraft, and a water cooling system including a water jacket and a water supply system receiving water from the jet propulsion unit and communicating with both the water jacket and the discharge nozzle, the water supply system comprising a flow regulator which controls water flow to both the water jacket and to the discharge nozzle in accordance with an output of the sensor, the deck portion extending over the outlet aperture, the discharge nozzle being connected to the jet propulsion unit upstream from the outlet aperture.

18. The watercraft of claim 17, wherein the discharge nozzle is mounted on the deck portion.

19. A watercraft comprising a hull defining an engine compartment, and engine disposed within the engine compartment, the engine having an engine body defining at least one combustion chamber therein and a first cooling jacket, an exhaust system comprising at least one exhaust conduit configured to guide exhaust gases from the combustion chamber to an exhaust gas discharge extending through the hull, the exhaust conduit including at least a second cooling jacket in thermal communication with at least a portion of the exhaust conduit, a coolant supply source, a first coolant supply conduit extending from the coolant supply source to the first coolant jacket, and a second coolant supply conduit extending from the coolant supply source to the second coolant jacket, wherein the first coolant supply conduit is independent from the second supply conduit.

20. The watercraft according to claim 19 additionally comprising a jet propulsion unit driven by the engine, the coolant supply source comprising a high-pressure area defined within the jet propulsion unit.

21. The watercraft according to claim 19 additionally comprising a catalyst device disposed within the exhaust system.

22. The watercraft according to claim 21, wherein the second coolant jacket is disposed in thermal communication with the portion of the exhaust system containing the catalyst device.

23. The watercraft according to claim 22 wherein the first coolant jacket is separated from the second coolant jacket.

24. A watercraft comprising an internal combustion engine having at least one exhaust port and an output shaft, a jet propulsion unit driven by the engine output shaft, an exhaust system extending between the engine exhaust port and an exhaust outlet to discharge exhaust gases from the watercraft, the exhaust system including at least one water jacket that extends along at least a portion of the exhaust system, an upwardly spraying water discharge nozzle formed separate from the jet propulsion device, and a water supply system receiving water from the jet propulsion unit and communicating with both the water jacket and the discharge nozzle, the water supply system communicating with the water jacket independent of the engine, wherein the exhaust system includes a catalyzer to treat exhaust gases from the engine before discharge through the exhaust outlet, and the water supply system includes a first delivery conduit which is connected to the water jacket upstream of the position of the catalyzer in the exhaust system, wherein the first delivery conduit is connected to the water jacket in the vicinity of the catalyzer, and wherein the water supply system includes a second delivery conduit connected to the upwardly spraying discharge nozzle and a multi-path junction which interconnects at least the first and second delivery conduits to a water supply line connected to the jet propulsion device.

25. A watercraft as in claim 24, wherein the water jacket surrounds at least a portion of the catalyzer.

* * * * *

UNITED STATES PATENT AND TRADEMARK OFFICE
CERTIFICATE OF CORRECTION

PATENT NO.    : 6,478,644 B2                                              Page 1 of 1
DATED         : November 12, 2002
INVENTOR(S)   : Shigeyuki Ozawa et al.

It is certified that error appears in the above-identified patent and that said Letters Patent is hereby corrected as shown below:

Title page,
After Item [22] Filed, Nov. 7, 1997, please insert the following:

Item -- [63] Related U.S. Application Data
Continuation-in-part of application No. 08/692,875, filed on Aug. 2, 1996, now Pat. No. 5,788,547. --

Item -- [30] Foreign Application Priority Data
August 2, 1995   (JP)………………….. 7-197699 --

Signed and Sealed this

Fourth Day of November, 2003

JAMES E. ROGAN
*Director of the United States Patent and Trademark Office*